(12) United States Patent
Gong

(10) Patent No.: US 8,277,319 B2
(45) Date of Patent: Oct. 2, 2012

(54) COMMUNICATIONS INTERFACE FOR A GAMING MACHINE

(76) Inventor: Xiaoqiang D. Gong, Henderson, NV (US)

( * ) Notice: Subject to any disclaimer, the term of this patent is extended or adjusted under 35 U.S.C. 154(b) by 1173 days.

(21) Appl. No.: 10/938,103

(22) Filed: Sep. 10, 2004

(65) Prior Publication Data

US 2005/0113172 A1     May 26, 2005

Related U.S. Application Data

(60) Provisional application No. 60/502,428, filed on Sep. 12, 2003.

(51) Int. Cl.
*A63F 9/24* (2006.01)
*A63F 13/00* (2006.01)
*G06F 17/00* (2006.01)
*G06F 19/00* (2006.01)

(52) U.S. Cl. ........... 463/42; 463/10; 463/25; 463/26; 463/41; 273/292

(58) Field of Classification Search ............. 463/10, 463/25, 26, 41, 42
See application file for complete search history.

(56) References Cited

U.S. PATENT DOCUMENTS

| | | | |
|---|---|---|---|
| 6,033,307 A * | 3/2000 | Vancura ............ | 463/20 |
| 6,061,722 A * | 5/2000 | Lipa et al. ............ | 709/224 |
| 6,125,385 A | 9/2000 | Weis et al. | |
| 6,645,077 B2 * | 11/2003 | Rowe .............. | 463/42 |
| 7,452,278 B2 | 11/2008 | Chen et al. | |
| 2001/0031652 A1 | 10/2001 | Gabai et al. | |
| 2002/0010024 A1 * | 1/2002 | Kusuda ............. | 463/42 |
| 2002/0052230 A1 * | 5/2002 | Martinek et al. ....... | 463/10 |
| 2002/0187825 A1 * | 12/2002 | Tracy et al. .......... | 463/17 |
| 2003/0046366 A1 * | 3/2003 | Pardikar et al. ....... | 709/219 |
| 2003/0069074 A1 | 4/2003 | Jackson | |
| 2003/0171149 A1 | 9/2003 | Rothschild | |
| 2004/0152508 A1 | 8/2004 | Lind et al. | |
| 2004/0163125 A1 * | 8/2004 | Phillips et al. ........ | 725/119 |
| 2004/0224771 A1 * | 11/2004 | Chen et al. .......... | 463/42 |

OTHER PUBLICATIONS

International Search Report.
Mizuta, Hideyuki, et al., "Web-based Simulation: Transaction Cycle of Agents and Web-based Gaming Simulation for International Emissions Trading", Proceedings of the 34th Conference on Winter Simulation, Dec. 2002, pp. 801-806.

(Continued)

*Primary Examiner* — David L Lewis
*Assistant Examiner* — Adetokunbo Torimiro
(74) *Attorney, Agent, or Firm* — McAndrews, Held & Malloy, Ltd.

(57) ABSTRACT

The present invention provides a system and method for an improved communications interface for a gaming machine. Certain embodiments of an improved gaming network include a gaming system including a communication interface, and a server providing at least one of an application, a service, and a status to the gaming system. The communication interface initiates communication with the server to transmit and/or receive information. The communication interface may allow games or other applications/services to be downloaded to the gaming system. In an embodiment, the communication interface facilitates voice over internet protocol communication, for example. The communication interface may also provide a secondary game at the gaming system and/or access to the Internet or other network, for example. In an embodiment, the communication interface facilitates purchase and/or confirmation of items and/or services at the gaming system. The communication interface may translate information to an appropriate protocol for the gaming system.

22 Claims, 5 Drawing Sheets

OTHER PUBLICATIONS

Oliveira, M. et. al., "An Innovative Design Approach to Build Virtual Environment Systems", Proceedings of the Workshop on Virtual Environments 2003, May 2003, pp. 143-151.

Alexandre, Thomas Dr., "Programming Techniques: Using Design Patterns To Build Dynamically Extensible Collaborative Virtual Environments", Proceedings of the 2nd International Conference on Principles and Practice of Programming in Java PPPJ'03, Jun. 2003, pp. 21-23.

* cited by examiner

```
<?xml version="1.0" encoding="UTF-8"?>
<Deck FontName="Verdana" FontSize="10" FontColor="000000"
    BackColor="FFFFFF" ButtonColor="808080">
        <Form ID="1" NextFormInterval="20" NextFormLink="#3">
            <Graphic ID="999" X="0" Y="0" Link="" ImageFile="background.gif" />
            <Label ID="1" X="230" Y="50" FontName="Verdana" FontSize="28"
                FontColor="000000" Text="Welcome"/>
            <Label ID="2" X="220" Y="110" FontName="Verdana" FontSize="14"
                FontColor="000000" Text="to the casino"/>
        </Form>

<Form ID="2" NextFormInterval="10" NextFormLink="#3">
            <Graphic ID="999" X="0" Y="0" Link="" ImageFile="background.gif" />
            <Label ID="1" X="230" Y="50" FontName="Verdana" FontSize="28"
                FontColor="000000" Text="Welcome [NN]"/>
            <Label ID="2" X="220" Y="110" FontName="Verdana" FontSize="14"
                FontColor="000000" Text="You have [PTS] points"/>
        </Form>

<Form ID="3">
            <Graphic ID="999" X="0" Y="0" Link="" ImageFile="background.gif" />
            <Label ID="1" X="230" Y="50" FontName="Verdana" FontSize="28"
                FontColor="000000" Text="Good Luck!"/>
            <Label ID="2" X="220" Y="110" FontName="Verdana" FontSize="14"
                FontColor="000000" Text="Countdown: [COUNTDOWN]"/>
            <Label ID="3" X="220" Y="170" FontName="Verdana" FontSize="14"
                FontColor="000000" Text="Session Pts: [SP]"/>
        </Form>

<Form ID="4" NextFormInterval="10" NextFormLink="#3">
            <Graphic ID="999" X="0" Y="0" Link="" ImageFile="background.gif" />
            <Label ID="1" X="230" Y="50" FontName="Verdana" FontSize="28"
                FontColor="000000" Text="Congratulations"/>
            <Label ID="2" X="220" Y="110" FontName="Verdana" FontSize="14"
                FontColor="000000" Text="You've earned [SP] points"/>
        </Form>
</Deck>
```

FIG. 5

COMMUNICATIONS INTERFACE FOR A GAMING MACHINE

RELATED APPLICATIONS

The present application relates to, and claims priority from, U.S. Provisional Application No. 60/502,428, filed on Sep. 12, 2003, with inventors Keith Kammler and Xiaoqiang Gong and entitled "Communications Interface for a Gaming Machine."

BACKGROUND OF THE INVENTION

The present invention generally relates to a gaming system. In particular, the present invention relates to an improved communications interface for a gaming system.

Gaming machines, such as slot machines, fruit machines, or poker machines, have in recent years become one of the more popular, exciting, and sophisticated wagering activities available at casinos and other gambling locations. At the same time, gaming machines have also become a source of greater revenue for gaming establishments. Thus, competition between manufacturers of gaming machines has intensified as competitors vie for business from gaming establishments.

A gaming machine providing entertaining and enticing features for players would be highly desirable to attract both new and returning players to a gaming establishment. Additionally, a gaming machine that allows customization and dynamic modification by an operator would be highly desirable to provide new features to customers.

Current gaming machines and other gaming systems are difficult to reconfigure and offer the same game or application to multiple users at multiple gaming establishments. Changing a gaming machine or other gaming system to a different game or format involves time-consuming and difficult procedures by an operator. Furthermore, adding or removing gaming machines or systems, such as gaming workstations, to a network is a time-consuming process involving a shutdown and reconfiguration of the network.

Additionally, configuration of a gaming machine by an operator raises concerns regarding security of data and integrity of a game on the gaming machine. That is, gaming establishments and legal authorities place high priority on the integrity of a game, such as a slot or poker game. Thus, there is a need for a configurable system that does not disturb sensitive game or prize data.

Current gaming systems are limited in the types and amounts of information that may be passed to and between gaming systems. Furthermore, many gaming systems lack processing power to utilize and/or display data passed to the gaming system. Thus, an improved interface and processing system would be highly desirable.

Thus, there is a need for an improved communications interface for a gaming machine that allows one or more gaming machines to communicate and dynamically alter operation and display.

BRIEF SUMMARY OF THE INVENTION

The present invention provides a system and method for an improved communications interface for a gaming machine. Certain embodiments of the interface include at least one input/output port for facilitating communication with a gaming system, a display for displaying images and text, and a processor for processing data for communication and/or execution by the gaming system. In an embodiment, the processor initiates communication with an external server. The processor may allow an application to be downloaded from a web server, for example. The processor may provide a secondary game at the gaming system. In an embodiment, the processor facilitates purchase and/or confirmation of items and/or services at the gaming system. The at least one input/output port routes game data, player data, player tracking information, slot accounting information, and/or radio frequency identification information, for example.

In an embodiment, the interface further includes a markup language viewer for processing a markup language document. The markup language viewer processes contents of the markup language document and resolves tokens in the markup language document to generate a resolved markup language document for display at a gaming system. The interface may also include an audio system providing audio output and/or audio input. The audio system may facilitate voice over internet protocol communication, for example. The interface may also include a printer for printing information from at least one of the gaming system and a server.

Certain embodiments provide an improved gaming network including a gaming system including a communication interface, and a server providing at least one of an application, a service, and a status to the gaming system. The communication interface initiates communication with the server to transmit and/or receive information. The communication interface may allow games or other applications/services to be downloaded to the gaming system. In an embodiment, the communication interface facilitates voice over internet protocol communication, for example. The communication interface may also provide a secondary game at the gaming system and/or access to the Internet or other network, for example. In an embodiment, the communication interface facilitates purchase and/or confirmation of items and/or services at the gaming machine through the gaming system. The communication interface may translate information to an appropriate protocol for the gaming system.

In an embodiment, the network includes a plurality of gaming systems, wherein each gaming system includes a communication interface. A communication from the server may be relayed among the plurality of gaming systems using the communication interfaces. In an embodiment, the plurality of gaming systems store redundant information, where the redundant information is retrievable via the communication interfaces.

Certain embodiments of a dynamically configurable gaming environment include a gaming system including a smart communications interface for retrieving a markup language document, a server providing a copy of the markup language document to the gaming system, and a network for facilitating communication between the server and the gaming system. The smart communications interface resolves tokens in the markup language document and formats the markup language document for display. The server provides the gaming system with information to modify a copy of the markup language document for display. The gaming environment may also include a database including information used to resolve the tokens at the smart communications interface.

In an embodiment, the smart communications interface further comprises a markup language viewer for resolving the tokens in the markup language document and formatting the markup language document for display. The smart communications interface may format and display secondary game content and the gaming system. The smart communications interface may facilitate at least one of purchase and confirmation of at least one of goods and services.

BRIEF DESCRIPTION OF SEVERAL VIEWS OF THE DRAWINGS

FIG. 5 shows a sample ML file used in accordance with an embodiment of the present invention.

Figure 1:
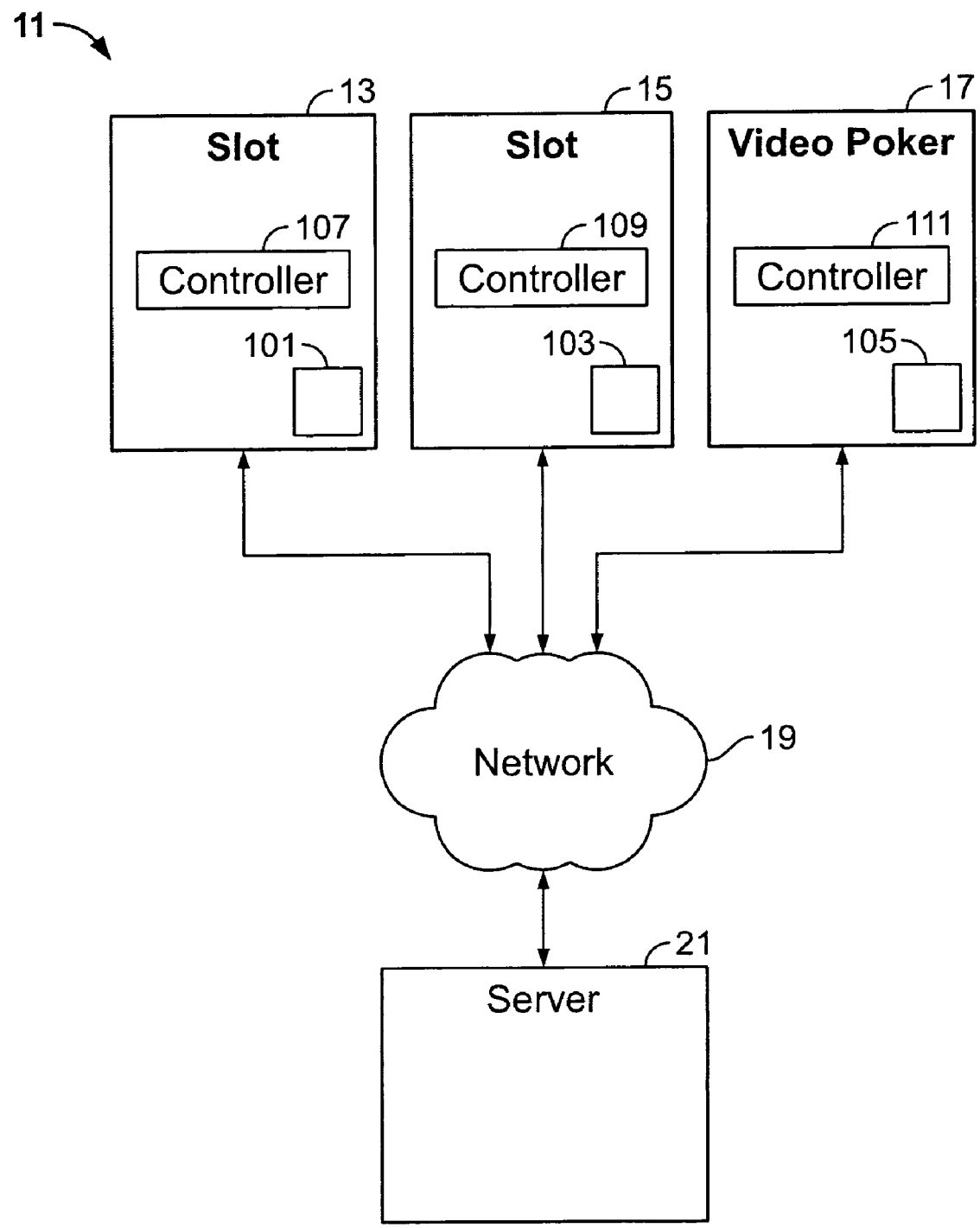
FIG. 1 illustrates a casino network system with an improved communications interface used in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Referring to FIG. 1, a casino network system 11 includes a plurality of gaming machines 13, 15, and 17 interconnected across a network 19 to a server 21.

Gaming machines 13, 15, 17 may utilize applications or web services of server 21 to provide visual displays. Gaming machines 13, 15, 17 may communicate with server 21 via network 19 using standard protocols.

Each gaming machine 13, 15, 17 includes a smart communications interface (SCI) 101, 103, 105, respectively, which communicates with a respective gaming controller 107, 109, 111 using a particular protocol, for example, a Slot Accounting System (SAS) protocol. SCIs 101, 103, 105 communicate directly onto network 19.

Server 21 may be designed to run on a network platform and to service requests from gaming machines 13, 15, 17. Server 21 may be accessed from network 19, through standard networking protocols, such as transmission control protocol/internet protocol (TCP/IP), user datagram protocol (UDP), telnet, file transfer protocol (FTP), hypertext transport protocol (HTTP), internet control message protocol (ICMP), internet group management protocol (IGMP), etc. Documents, such as hypertext markup language (HTML), extensible markup language (XML), rich text format (RTF), etc., may be transmitted to and/or from server 21.

Server 21 has a multi-tiered architecture that includes a number of software layers including one or more applications, an application program interface (API) and an operating system. The applications provide a number of different services, including accounting services, player tracking services, progressive game services, browsing services, cashless play services, etc. The applications may be written in various languages including, for example, C#, Java, or SQL. The operating system for example, is a Windows® brand operating system which provides conventional functions.

Server 21 may push out, i.e., publish, information to various subscribers including gaming machines 13, 15, 17. For example, gaming machine 13 may subscribe to a "bonus time" alert. Server 21 notifies gaming machines that have subscribed that a bonus period has started and that jackpots are to be paid out at twice the pay table, for example. This bonusing service for particular gaming machines may be subscribed to, for example, using casino workstation 31 (not shown). Workstation 31 may communicate a request to server 21 to publish to specifically identified gaming machines that a bonus period is to begin. The request may also provide additional information as to the amount of the bonus, the type of bonus, a bonus multiplier, etc. The request may also ask server 21 to publish the end of the bonus period as well. The server 21 may provide such a bonus service in real time with the bonus event, or merely provide a scheduled command for future bonus events.

In another example, applications server 21 may publish to certain gaming machines that a tournament has ended. Using the method taught in U.S. Pat. No. 6,039,648, assigned to Casino Data Systems and incorporated herein by reference, server 21 may communicate the end of a tournament play, so that appropriate pay tables and displays at the gaming machines may be activated.

Server 21 may include a plurality of functions that may be called by other systems or devices connected to network 19. Such functions may include conventional method or function calls as well as remote calls, e.g., proxy and simple object access protocol (SOAP)/XML invocations. For example, server 21 may be called by gaming machines 13, 15, 17.

Server 21 provides data to or retrieves data from a database 45. For example, data is stored as to gaming activity, player account information, advertisements, ticketing, etc. For example, meter data is received by server 21. Server 21 stores the meter data in a database. Also, data is retrieved including player information, accounting data, application programs, etc.

For purposes of simplicity, only three gaming machines 13, 15, 17 are shown in FIG. 1. In actuality, a casino may contain hundreds, or even thousands, of gaming machines. In addition to gaming machines, a casino may include various non-gaming machine locations, such as craps and blackjack. Such locations include an SCI, similar to SCI 101, 103, or 105, which is connected to network 19. In an embodiment, gaming and non-gaming machine locations may be spread throughout several casinos located remotely from one another.

Server 21 provides services for each gaming machine. Server 21 may provide different services for different gaming machines. For example, gaming machines may be included in a progressive game and thus use a progressive service from server 21. Typically, all gaming machines use an accounting service from server 21 which accounts for coins and bills inserted into the gaming machine as well as an accounting of coins cashed out of the gaming machine to a player.

Other services, such as player tracking and cashless play services, may be provided by server 21. A typical player account may be stored in a database for tracking of the player. The player accounts are updated by server 21 as player information is sent to server 21 from gaming machines 13, 15, 17, workstation 31 or an external system 33. For example, a restaurant acting as an external system 33 may request server 21 to add loyalty points to the player's account in the database based on the amount of money spent by the player at the restaurant. As another example, a player at gaming machine 13 may request server 21 to convert 1000 points of the points balance in the player's account to credits on the credit meter of gaming machine 13. As another example, server 21 may provide game programs or other parameters to a particular gaming machine.

More specifically, gaming machine 13 sends a service request to server 21. SCI 101 packages the request in a proper protocol and places the request onto network 19. Various switches and/or routers may be included in network 19 in order to route the service request to server 21. The request may include (1) data, (2) a message request, and (3) the network address of server 21. The message request seeks a particular service to be performed by execution of an application by server 21. The application is run in connection with the data, if any, in the request. The application may then generate a message back onto network 19 addressed to machine 13. SCI 101 receives the message and responds accordingly, as for example, adjusting the credit meter, generating a display of information to the player, etc.

Alternatively, SCI 101, 103, or 105 may be connected to a hub for wireless communication of the service request to the network 19. The service request is received by the hub, repackaged and then broadcast to a receiving device that is connected to the network. The receiving device packages the service request and places the service request onto the network.

Figure 2:
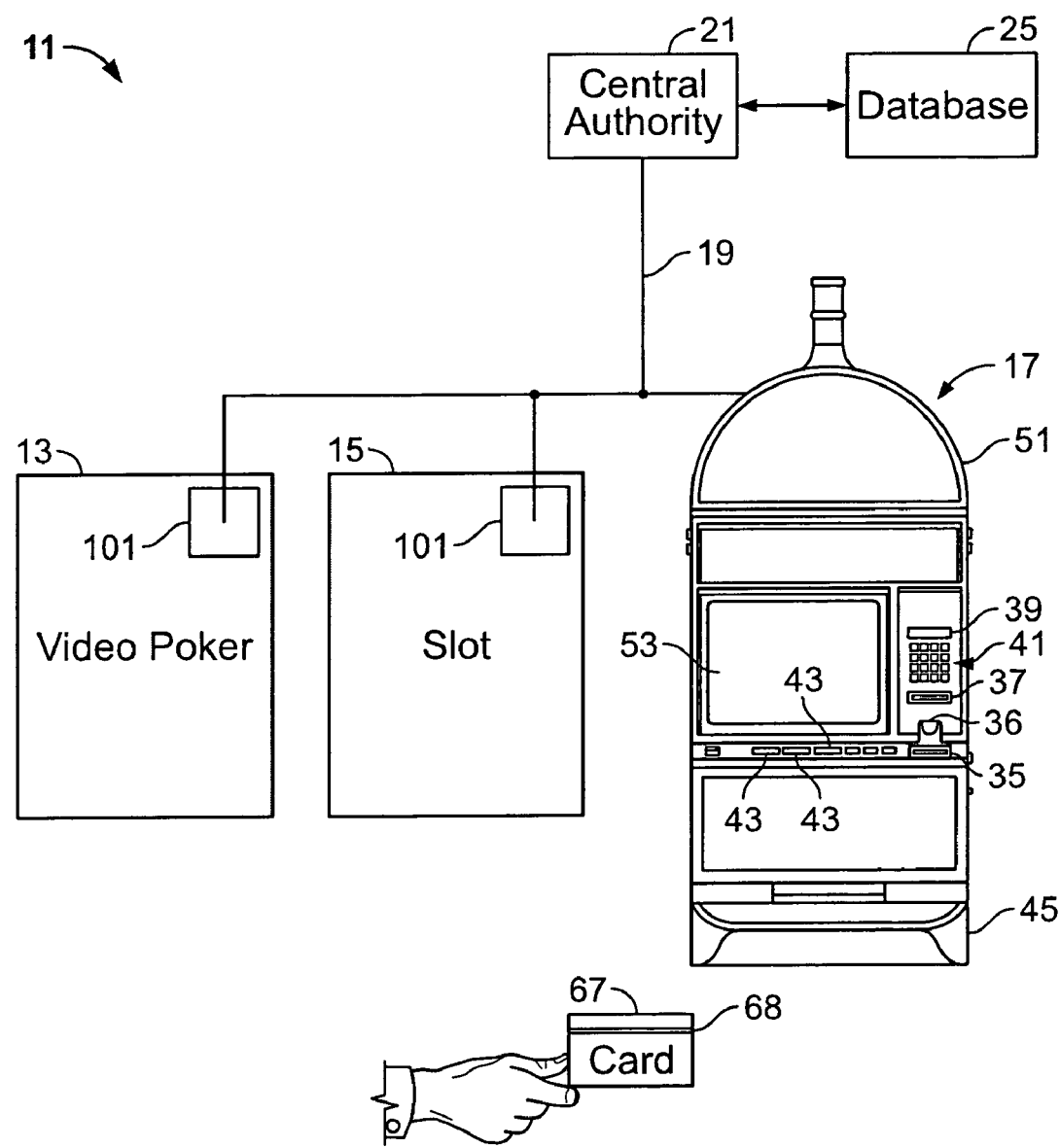
FIG. 2 illustrates a casino network system with an improved communications interface used in accordance with an embodiment of the present invention.

Referring to FIG. 2, another embodiment of a gaming system 11 includes a plurality of gaming machines 13, 15 and 17 interconnected over a network 19 to a central authority 21. Where a large number of gaming machines are connected to central authority 21, network 19 may include subnetworks using RS485 serial communication standard and data collection units (not shown). Network 19 also may be configured as an Ethernet network employing TCP/IP protocol, or may comprise a digital subscriber line (DSL) network, a fiber optic network, an RF network, etc.

Data is transmitted over network 19 between the gaming machines and central authority 21 which may be formed of one or more computers. Each gaming machine includes a smart communications interface (SCI) 101 for control of communications over network 19. Interface 101 is a microprocessor-based device. Central authority 21 stores game output data (received from the gaming machines) and may store game input data (to be sent to the gaming machines) in a central database 25.

More than the three gaming machines 13, 15 and 17 may be connected to network 19 of FIG. 2. For example, gaming machines 15 and 17 are slot electronic gaming machines and gaming machine 13 is a video poker electronic gaming machine. Other types of gaming equipment and gaming machines may be connected to network 19 of FIG. 2, including table games.

Gaming machine 17 is shown in more detail in FIG. 2 and includes a housing 51 that supports a number of components including a main display 53 which is positioned on the outer front face of the machine for direct presentation of a display to the player. An input area 35 receives a wager from the player in the form of currency bills or bar-coded vouchers. A card receiving slot 37 is positioned to receive a player card for use to identify the particular player at the gaming machine, as described hereinafter. A secondary display 39 also may be included, for the display of supplemental game and non-game information to the player, typically, in the form of instructions, points balances, or other information. As understood, all or part of supplemental display 39 may take the form of a display window located on primary display 53 or a secondary window on display 53. A keypad 41 is provided to allow the player to input data to the SCI of the gaming machine, particularly in response to instructions or questions on supplemental display 39. In addition, a plurality of decision making buttons 43 (and optionally a handle, not shown) are used by the player to play the game of machine 17. A payout tray 45 provides an area for redemption of awards based on play of the game, and a printer (not shown) may be used to print tickets or other redemption documents.

Display 53 displays the primary game features for play of a game. For example, the display may generate a conventional slot game in which a plurality of symbols are moved within their respective column, as if rotated, at the appropriate time in response to the user activation of the gaming machine.

Figure 3:
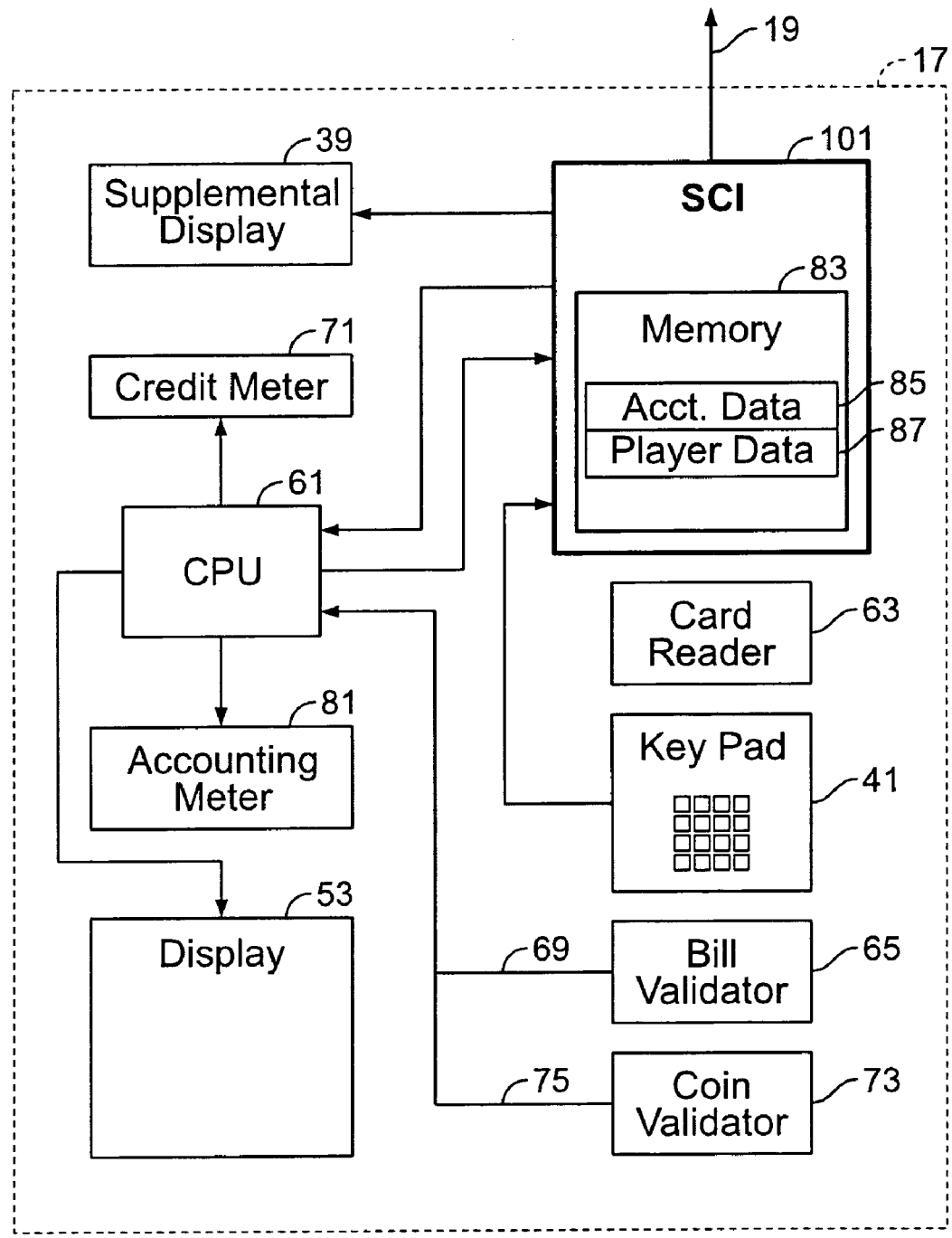
FIG. 3 depicts a gaming machine used in accordance with an embodiment of the present invention.

Referring now to FIG. 3, gaming machine 17 includes a game control CPU 61 which is responsible for carrying out the main functions of the gaming machine. CPU 61 executes each game as the player interacts with the gaming machine, including visually and/or audibly interacting with the player, as well as generating game outcomes. In addition, CPU 61 processes network information by receiving from, and sending data to, smart communications interface (SCI) 101. CPU 61 includes a microprocessor and associated memory (not shown particularly). Depending upon the type of gaming machine, CPU 61 may directly carry out some or all of the functions that SCI 101 may carry out.

Gaming machine 17 includes a number of peripheral devices including, for example, a card reader 63 and key pad 41. Card reader 63 and key pad 41 are used to identify the player at the gaming machine 17. The casino issues a player a player card 67 (FIG. 2) through an application process. Player card 67 typically includes a magnetic stripe 68 that is encoded with data to identify the player. In some cases, a personal identification number (PIN) is given to the player for security, and may allow access to certain features of the gaming machine. Card 67 is readable by a card reader 63 found in each of the gaming machines 13, 15, 17. Other types of cards may be utilized including optical cards, smart cards, etc.

In addition, a unique number is encoded onto a magnetic stripe 68 carried by the card. This unique number corresponds to a player account file which is maintained by central authority 21 in database 25. The account file may include information such as the player's name, address, amount of credit available, amount of promotional credits, amount of loyalty points, etc.

The player inserts his or her player card 67 into card receiving slot 37 (FIG. 2) for reading by card reader 63 (FIG. 3). SCI 101 detects the card insertion and receives the identification information contained on card 67. For example, the player's name, address and player tracking account number may be encoded on the magnetic stripe. The information contained on card 67 may be a reference number to retrieve player data from database 25.

SCI 101 provides display signals to display 39 in order to, for example, display the player's name, or other message. Select messages may be displayed, for example, requesting the player to optionally enter his or her personal identification number (PIN) using keypad 41. Where the PIN is optionally entered by the player, SCI 101 communicates with the central authority in order that the PIN, for example, may be used to validate the player's identity. In other cases, the PIN may be used to access some features of the gaming machine 17 or system 11. Either the central authority or the SCI performs validation.

SCI 101 gains access to the player's account at the central authority. The player's account typically includes the number of player points (loyalty points) previously accumulated by the player, as well as additional statistics. In order for the gaming activity at a particular machine to be credited to the player's player account, the player or player account is identified at the gaming machine. Identification is typically accomplished by the player inserting his or her player card.

A PIN alone without a player card may be used to provide player identity to the gaming machine; and a card alone without a PIN may be used to provide player identity to the gaming machine. Alternatively, any of several biometric devices may be used to identify the player, including devices to check fingerprints, scan facial appearance, provide eye scans, etc. Such biometric input data may be used alone or in combination with player cards or PINs.

During game play, CPU 61 tracks gaming activity and provides gaming activity information to SCI 101. Such information may include an amount of money a player has wagered on each game, a number of games played, a time each game was initiated and a particular identification of a gaming machine, etc. For example, a system may track money wagered, money won and the time period tracked. Tracked information may be obtained by the SCI polling the CPU. The game activity information is sent to the central authority by the SCI. The central authority utilizes the game activity information to perform accounting functions and additionally generates player points which are added to the points in the player's account. Awards are provided by the casino in accordance with points accumulated by the player.

Any pre-stored data in the player's account may be downloaded to SCI 101 which in turn provides corresponding signal data to CPU 61. Where gaming machine 17 allows for player selection of the particular game played, players may pre-store their game preference in central database 25 (FIG. 2). Preference data may be downloaded to gaming machine 17 after player identification at the gaming machine.

The communication between SCI 101, central authority 21 and CPU 61 may take on different forms and protocols, as for example, serial, parallel, Ethernet, etc. In one embodiment, the SCI may be connected to the CPU 61 through a serial connection and communicates in accordance with a particular communication protocol or protocols depending upon the manufacturer of the particular gaming machine.

After a particular player has been identified as a valid player, other messages are presented on display 39. For example, the balance amount of points or credit remaining in the player's account may appear on the display. The player may use key pad 41 to download credits to the gaming machine, as described in U.S. Pat. No. 6,511,377 incorporated herein by reference.

Card reader 63 is housed in gaming machine 17, and positioned relative to card slot 37 to receive player card 67. Card 67 is inserted into reader 63 and information read from card stripe 68 is transferred to SCI 101 and stored in a memory 83 located in SCI 101.

A bill validator 65 is housed in gaming machine 17 and positioned relative to wager area 35 to receive currency bills inserted into validator 65 by a player. Bill validator 65, which may receive several bill denominations, detects the denomination of an inserted bill and generates a signal 69 to CPU 61. Bill validator 65 may also receive encoded vouchers or tickets and responsively generate a proper signal 69 relating to ticket insertion.

CPU 61, for example, responds to signal 69 by increasing the value on a game credit meter 71. Depending on the type of gaming machine, a value of credit meter 71 may be displayed on display 33. Credit meter 71 provides a visual indication to a player of a number of game credits available for play. In an embodiment, signal 69 may be sent to SCI 101, which in turn communicates with CPU 61 so as to change credit meter 71. Communication with the CPU through the SCI to change the credit meter may occur when a bill validator is retrofitted into a gaming machine that was originally manufactured without a bill validator. CPU 61 increases the credit meter after a ticket signal is received and value is determined.

A coin validator 73 is housed in gaming machine 11, and positioned relative to a coin slot 36 (FIG. 2) to receive coins which are inserted by a player into coin validator 73. Coin validator 73 generates a coin signal 75 to CPU 61. CPU 61, for example, responds by increasing the value of credit meter 71.

In accordance with a configuration of gaming machine 17, the gaming machine begins a game (for example, the reels spin) automatically after the credits appear on the credit meter or the game is started after the player presses a button 43 or pulls a handle (not shown).

Then, the game ends and a particular result appears. The gaming machine pays out certain amount(s) depending upon the result in a conventional manner. The pay out may include applying an amount directly to the credit meter 71, or paying the amount in coins or tokens directly from the slot machine to the player at tray 45, or where the amount is above a threshold level, a hand pay is made of the amount to the player. The player may cash-out credits by activating a cash-out button 43 or upload credits to the player's account in database 25. A ticket printer (not shown) may be used to dispense bar coded vouchers on cash-out, as well.

If a player desires to discontinue play or move to a different machine, the player removes the player card. Thereafter, the player card may be inserted into the same or a different gaming machine for continuing play.

The player's account may be formed of multiple accounts, for example, a CASH account, a POINTS account, a PROMO account, etc. Credit may be placed in the player's PROMO account by the casino as a complimentary incentive. This may happen when a player first arrives at the casino at hotel check-in or other event. Alternatively, credit may be applied to the player's CASH account in accordance with the player making a deposit of money, either coins or tokens directly into the slot machine or at a cashier. Such credits (or value) may be downloaded to the gaming machine and placed on credit meter 71.

The player's gaming activity is tracked by system 11 once the player account is established, the player has been issued a player tracking card bearing a unique identification number and the account is in a file in database 25, for example. The player's transactions at the gaming machine are logged by SCI 101 and reported to central authority 21.

In some situations, multiple player cards may be issued for a single account; each card identifies the same account. Each card may carry the same identification number. For example, a husband and wife may share a single account. The first card inserted allows the player to retrieve any or all of the credit available in the player's account. The second card inserted allows the second player to retrieve any remaining credit that remains in the account. Where both cards are simultaneously used on separate gaming machines, all player transaction activity is collected and forwarded to the player's account.

Numerous types of reports may be generated based upon the transaction activity logged in the player's account. For example, the amount of money played by the customer, the amount of credit used from the player's account, the amount of complimentary incentive credit utilized by the player, the amount of points converted to play credits at the game, the machine upon which the transaction occurred, the time of the play, or other event, etc.

Information Accounting by CPU 61

Referring again to FIG. 3, CPU 61 keeps a plurality of accounting meters 81 that log transaction and machine data. Meters may be formed of electronic memory managed by CPU 61 and/or hard meters. CPU 61 responds to various gaming machine events and updates meters 81 accordingly. Meters 81 may be non-reset, accumulative meters; however, some meters 81 may be reset meters and statistics are available since the last reset of the meters. Basic events in which CPU 61 adjusts meters 81 may include:

(1) money input by the player;
(2) wagers placed by the player;

(3) game wins from play of the game; and (4) cash out of credits by the player.

Only the particular meter(s) 81 to which an event pertains are adjusted upon the occurrence of the event. Data identifying the occurrence of events may be recorded also, including the time of the event and the particular type of event.

For example, meters 81 may include various drop meters to track money flow. A drop meter may be provided for each of the different forms of monetary value accepted by the gaming machine. For example, a coin drop meter may represent the total value of coins that fall to a "drop bucket" within the gaming machine housing for later collection by the casino. Also, coins may instead be diverted to a hopper system for later payout to the player and such diverted coins may be metered separately. Also, a bill count drop meter may count all paper currency that has been inserted into the bill acceptor. As another example, promo count meters count promotional credits that are received by the gaming machine from bar coded coupons, downloaded credits, bonus point conversions, and the like. Outflow of cash to the player may also be tracked by meters, including printed vouchers that have been issued by the machine.

Meters 81 may also keep track of game activity and include a game play meter for tracking the total number of bets actually wagered and a game win meter for tracking the total number of wins. Purchased credits which are not wagered, but cashed out, may be tracked as well. Credit meter 71 is a visual meter which reflects the total amount of credit available to the player at any time, and may be driven from another meter 81.

SCI 101 Retrieves Data from CPU 61

CPU 61 communicates data to SCI 101 including events and readings of the accounting meters 81. For example, SCI 101 may poll CPU 61 for data, and then record such data in a memory 83. The data may be further processed by SCI 101, and then the processed data is stored in memory 83. Particular data stored in memory 83 includes accounting data 85 as well as player data 87 which is used to award player points.

SCI 101 performs game accounting functions by updating accounting data 85 and player data 87. SCI 101 transmits data 85, 87 to central authority 21. In addition, accounting data 85 and player data 87 may be initialized by central authority 21.

Type of Information Reported

Tracking of data at the gaming machines occurs for carded and non-carded players. A non-carded player is a player who does not insert a player card during play. SCI 101 may retrieve data from CPU 61 including data stored by CPU 61 in meters 81. SCI 101 may also keep data that SCI 101 has obtained from sources other than CPU 61, such as data obtained from card reader 63. SCI 101 may process the data and convert the data to a particular form prior to transmittal to central authority 21. For example, data regarding a number of coins played during a certain period of time may be calculated by SCI 101 based on coin-in meter data at a start of the period and coin-in meter data at an end of the period.

SCI 101 reports certain data to central authority 21 which is placed in database 25. However, SCI 101 reports particular data, i.e., player data 87, which is related to the game activity of the player. Central authority 21 uses player data 87 to calculate player points and store player points in a particular player account held in database 25. For example, central authority 21 may calculate a number of loyalty points based on coin-in data of the player, and thereafter store points data in a player account. Alternatively, SCI 101 may perform points calculation and transmit the points data for storage in the player account in database 25.

When Information is Reported

SCI 101 may report a variety of accounting data to central authority 21 at various times. SCI 101 reports player data 87 which SCI 101 has accumulated in connection with the occurrence of a gaming session. The data may be reported when a player removes his or her player card from card reader 63. Where a player has the ability to convert points stored in his or her account to credits at the gaming machine, the timing of points credited to the player account may become important. It may be desirable also to forward player data 87 at predetermined times, for example, every hour, where the player's gaming session occurs over a lengthy period of time.

Employee Cards

Employees of a gaming establishment, such as a casino, have employee cards that are insertable into a gaming machine. The employee card may include a magnetic stripe that is read upon insertion to alert SCI 101 that an employee is present at the gaming machine. Thereafter, particular functions of the gaming machine (or SCI 101) are made available to the employee.

When an employee card is inserted into reader 63, SCI 101 recognizes the card as an employee card. However, if an employee card is inserted, then normal employee menus are displayed on display 39. If a card may not be read then a message such as "BAD CARD READ" is displayed on display 39.

Identification of a player and/or employee may be performed by a magnetic card reader, an optical card reader, a card swipe reader, a card insertion reader, a smart card reader, or other device which alerts SCI 101 by providing SCI 101 with player identification information of the player who is about to activate play on the gaming machine. Devices other than card readers may be used to provide identification information, such as a biometric sensor, a fingerprint sensor, a palm sensor, a hand sensor, an eye sensor, an iris sensor, a visual recognition system, an audio or voice recognition system. The device provides player identity information to SCI 101 at the time that the player is about to commence play. Player identity information may be transferred by radio waves or infrared radiation, for example, from a portable or handheld device. Card removal may be determined in a number of ways, including sensors such as audio, visual, thermal, motion, infra-red, magnetic, light detectors, etc.

Smart Communications Interface

In an embodiment, SCI 101 (e.g., Sentinel III®) includes a microprocessor. SCI 101 includes one or more memories for communication, storage, and processing operations, such as flash memory, static RAM, dynamic RAM, and/or non-volatile RAM, such as NVRAM, for example. In an embodiment, incoming data is stored in NVRAM in case power is removed from the SCI 101. SCI 101 may support a variety of power supplies, such as 110 and 220/240 power. SCI 101 may be a separate component and/or integrated into a gaming system, such as a workstation or gaming machine 17.

SCI 101 also includes a user interface, such as a TFT (Thin Film Transistor) Active Matrix LCD interface (with optional touch screen). An Active Matrix LCD interface provides increased screen update and response time to reduce display artifacts created by moving objects on the screen. In the past, passive color LCD displays have a limited viewing angle and may not effectively be used for video clips replay. The TFT active color LCD display is used by the SCI 101 to provide static pictures and dynamic video clips with vivid color or grayscale. The LCD display with touch screen may be used to enter information, such as player identification information or game play options. SCI 101 may also include an additional LCD character/VFD (Vacuum Fluorescent Display) graphic display interface.

In addition, a Video Input Port (VIP) may be incorporated in SCI 101 to provide real-time videos or provide streaming videos. For example, a picture is captured by a camera, converted, and sent to the VIP. Additionally, an MPEG player, such as an MPEG 2 or 4 player, may be connected to the VIP along with an MPEG decoder to provide video via SCI 101. The VIP may be used in conjunction with the SCI display to provide sports scores, news, game announcements, weather, flight information, show times, specials, etc., on the SCI display. Advertisements, promotions, or other information may be displayed at SCI 101 or display 53 when gaming machine 17 or workstation 31 is idle. SCI 101 may further include or be connected to a printer to print reward tickets, prize tickets, coupons, airline or show tickets, reservation confirmation, or other information, for example.

In an embodiment, information may be transferred between an SCI display and a display 53 on the gaming machine 17. Information may be displayed in different sizes and/or formats on the SCI display and/or display 53. Adjustable display sizes/formats may accommodate people with vision impairments and allow different amounts of information to be displayed for a user.

In an embodiment, an audio system, such as an AC'97 Audio system or personal computer sound system, is incorporated in SCI 101 to provide a high quality stereo sound and to reduce manufacturing costs. The audio system may include a microphone input and speaker output. Sounds associated with a game or program may be broadcast to a player using the audio system to enhance the player's gaming experience.

In addition, Voice over Internet Protocol (VoIP) technology may be used by SCI 101 to manage the delivery of voice information using Internet Protocol. Voice information is delivered using the Internet Protocol. Voice information is handled in digital form in discrete packets. An Ethernet or similar connection is used to provide VoIP from one SCI 101 to the other SCI 101. VoIP may be used to communicate with a player and enhance a player's gaming experience. For example, the SCI 101 may allow a player to talk to other people in a gaming establishment or other location from a gaming machine. In an embodiment, a friend or "buddy" list may be compiled by a player and stored in a database and/or on a player card. The player may insert the player card into a gaming machine, load a buddy list, set his or her status, and perform other communication activities, for example. In another embodiment, a player may make restaurant reservations, show reservations, hotel reservations, and/or bar orders, valet requests, and/or check on the status of such reservations, for example. A microphone or other voice input may also allow a player or operator voice control of a gaming system.

In an embodiment, SCI 101 includes a compact flash connector. The connector receives a conventional CompactFlash card. Use of compact flash or other non-volatile memory permits great convenience, reliability, availability and low cost. ML documents and other data may be stored in the CompactFlash or other memory card located in the connector.

SCI 101 provides a plurality of interfaces for communication from and/or to peripheral devices or gaming machine components. For example, SCI 101 may include a keyboard and/or mouse interface, a keypad interface, a progressive interface, a fiber-optical interface, a lockout interface, a magnetic/optical card reader interface, a Slot Data System (SDS)/IGT pulse interface, a slot accounting software (SAS)/GDAP interface, and/or other interface. SCI 101 may also include a PCI (peripheral component interconnect) bus connection, or USB (Universal Serial Bus), for further expansion. In an embodiment, interfaces and connections of a Sentinel III® SCI support compatibility with other SCI embodiments, such as a Sentinel II® communication interface manufactured by Aristocrat Technologies, Inc., of Las Vegas.

SCI 101 also includes a plurality of communication ports for data transfer with peripheral devices or other components of gaming machine 17. Ports may include Ethernet connections, USB (universal serial bus) ports, serial ports (RS-422 and/or RS-485, for example), infrared (IR) ports, and parallel ports (such as a printer port). In an embodiment, the Sentinel III SCI 101 includes 1 10/100 10BaseT Ethernet connections using CAT5/6/7 wiring, 1 USB ports, and 6 serial ports (including 1 IR port). Ports may allow input from devices such as a ticket printer, bill validator, control hopper, and/or card reader. An Ethernet connection may be used to provide graphic capabilities, such as streaming video for marketing and advertising during game play. Additionally, SCI 101 may include a variety of inputs and outputs, such as opto-isolated inputs, direct inputs, and opto-isolated outputs.

Thus, certain embodiments provide a communications interface that allows gaming systems to bypass a poller and communicate directly with a server, database, or other system using a protocol, such as Ethernet or other communication protocol. In an embodiment, a gaming system with an SCI 101 pushes data onto an Ethernet or other network, rather than being polled for data. Communication may occur in an event-driven model, in addition to a scheduled, timing-based, or polled model, for example. Data is transmitted from the SCI 101 to a server and/or database, for example, and may then be further processed by a server or other system. In an embodiment, communications between the SCI 101 and other systems are secure communications.

Figure 4:
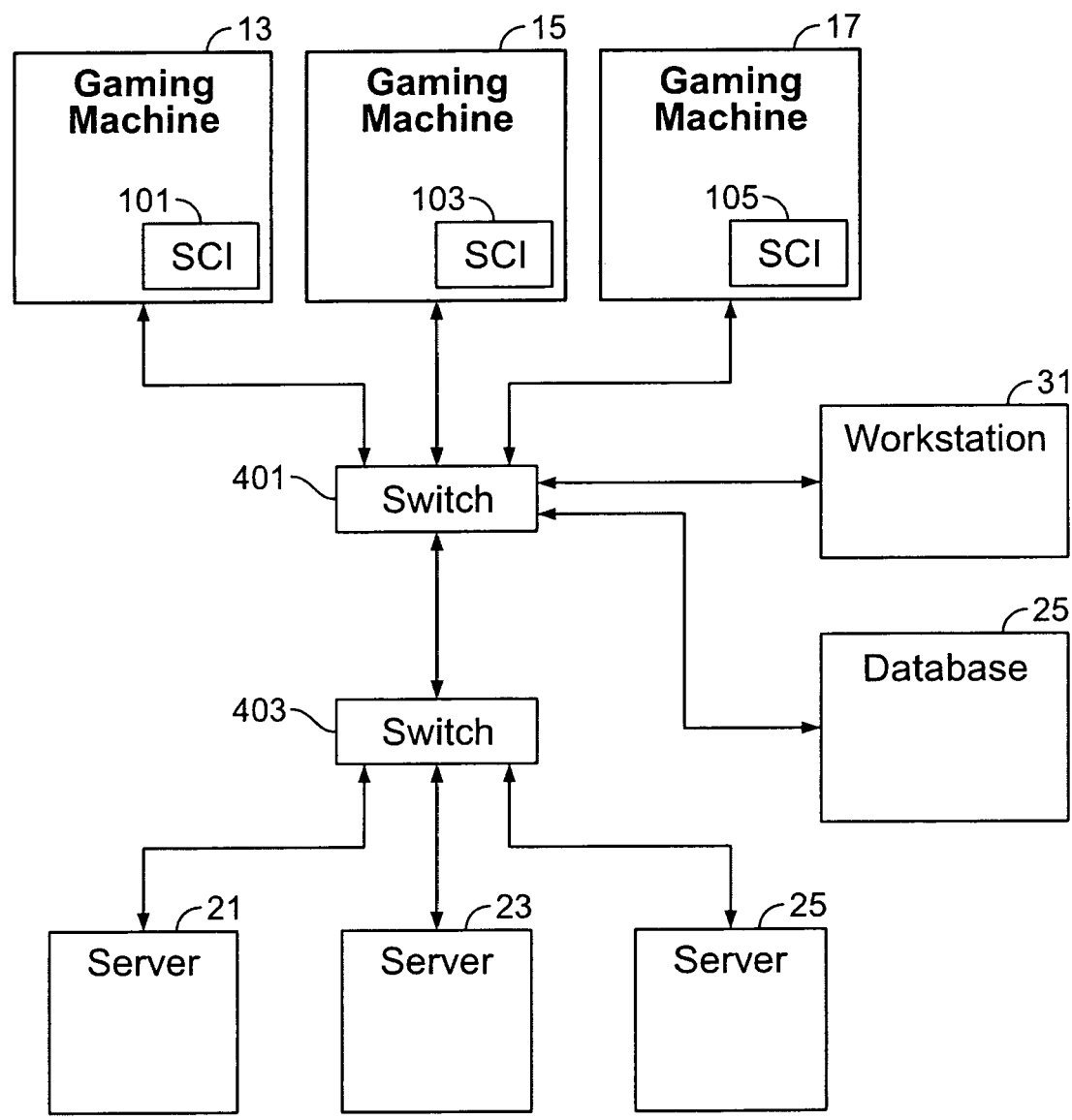
FIG. 4 illustrates a gaming network used in accordance with an embodiment of the present invention.

In operation, a player interfaces with an electronic gaming machine (EGM), such as machine 17. The EGM notifies the SCI 101. The SCI 101 determines an event and either sends data immediately or waits and transmits data at a later time. As shown in FIG. 4, a plurality of EGMs 13, 15, 17 with SCIs 101, 103, 105 may be connected in a floor network in a gaming establishment. Network switches 410, 403 route data to a database 25, server network 21, 23, 25, workstation 31, or other system, for example. In an embodiment, load balancing may be used to distribute data and application requests among multiple database and application servers. In another embodiment, a wired network may be replaced with a wireless network with wireless access points connecting servers and EGMS instead of network switches. The SCI 101 may format data in an appropriate form using an appropriate protocol coming from and/or going to the gaming machine 17. Thus, in an embodiment, the SCIs 101, 103, 105 may serve as translators to help ensure that EGMs and networks may communicate with each other. SCIs and EGMS may communicate for VoIP, tournament play (e.g., set up local slot tournaments), file-sharing, and/or local progressive and/or bonus game, for example.

In an embodiment, the SCI 101 is compatible with HTTP or similar protocol to enable access via a secure Web, Internet, or private network. The SCI 101 allows a user to check game, jackpot, and/or machine status, and may allow a user to access the Internet or other network to purchase and download game information from a gaming establishment. A user may be able to view progressive jackpot values via the Web, for example. Additionally, the SCI 101 may allow an operator to download games and/or updates from a network, such as the Internet or private network, to an EGM or upload data from an EGM to a server, for example.

In an embodiment, SCI 101 may relay information. For example, a server may communicate with the first EGM of a group. The SCI of the first EGM relays the message along to other EGMs in the group while the server monitors the communication. In another embodiment, redundancy in communication channels provides backup and redundancy in case of error or partial network failure. For example, each EGM in a group may have a copy of a progressive game and jackpot information so that the EGM may share the information with the other EGMs if one machine goes down.

SCIs 101, 103, 105 may be used to tie gaming machines or other gaming systems together in a network. For example, SCIs 101, 103, 105 may be used to tie together gaming machines 17 located on opposite sites of a casino floor for a progressive game. In an embodiment, SCI 101 may be used to allow gaming machines to communicate with each other. For example, one player may play two adjacent gaming machines 15, 17 with a single player card and receive loyalty points from both machines 15, 17. A player may swipe a player card separately on both machines 15, 17 or may swipe the card at one machine 13 and be able to select other machines 15, 17 to add. In an embodiment, a password or other authentication method may be used to verify that the player is playing multiple machines and is authorized to receive points and/or prizes from multiple machines 13, 15, 17.

In an embodiment, SCI 101 checks a central authority or other server and requests information such as bonus information, progressive information, game information, etc., rather than waiting for the central authority or other server to broadcast the information. Thus, initiation of a request comes from the SCI 101 rather than a central server. If there is a break in communication with the central authority or other server, then the SCI 101 may operate in a default mode pre-programmed at the EGM or SCI 101. SCIs 101 may communicate machines or game status information to a central authority or other server, for example. If a bank of machines is idle or not busy, the central authority or other server may award more compensation points, extra prizes, bonus games, or other incentives for a certain time on the bank of machines, for example.

SCI 101 may facilitate transactions at a gaming machine. Credits for a game may be input via SCI 101. Charges for services such as VoIP, video, chat, tickets, reservations, etc., may be obtained via SCI 101. Internet access may be available at a gaming machine via SCI 101. Shopping may be facilitated at a gaming machine via SCI 101, and users may be allowed to enter payment and shipping information via SCI 101. Credits may be deducted for services at a gaming machine. If a player wins a prize or other compensation, the player may enter information at gaming machine 17 via SCI 101, and a casino employee, for example, may bring the prize or other compensation to the player. In an embodiment, certain services, such as a sports or news ticker or audio/video program may be activated if a game is being played at a gaming machine. In an embodiment, secondary bets may be placed on sporting events or lotteries via SCI 101.

Using SCIs allows for easier configuration and installation of gaming machines on a network. EGMs may be added, removed, and/or reconfigured by connecting or disconnecting an EGM the network via the SCI. The SCI synchronizes the machine with the network. In an embodiment, running an operating system such as Windows CE® with a compact Microsoft .NET® framework on an SCI allows ease of application development, interfacing, and networking.

Formatting a Gaming Machine Display Using a Markup Language

In an embodiment, a gaming machine, gaming workstation, or other gaming system uses a markup language (ML) for display and interaction purposes in a gaming or ancillary gaming application. SCI 101 uses a markup language (ML) for display and interaction purposes in a gaming or ancillary gaming application. A markup language viewer is used to facilitate display, execution, and/or parsing of data from a ML document. In current systems of the art, dedicated software routines specify the fixed locations of content, such as images, and references, such as links, by hard coding them in code or in tables of constants within the code. Conversely, a markup language document is an external, changeable document that is analyzed and parsed or rendered dynamically. Changes may be implemented without changing program code. When operation of a gaming machine transitions within an area of operation or from one area of operation to another, a markup language file may be loaded, parsed, and the information therein used to specify the content of a display.

In addition, replaceable "tokens" or other indicia may be used in a markup language in a gaming or ancillary gaming application. FIG. 5 illustrates a sample ML file including tokens to be resolved according to an embodiment of the present invention. Tokens in FIG. 5 are indicated by square bracket (e.g., "['s") to allow the ML viewer to resolve the tokens using a database or local storage.

In one embodiment, servers may utilize a server-side content generation program to provide unique and interactive content in response to client side queries. In another embodiment, rather than relying on a server to provide content specific to interaction, "client" side content is used. A client "page" contains certain "text" that is detected and replaced by other text or value when the page is rendered. In an embodiment, replacement text is of a dynamic nature and is retrieved from a local storage by a token look up method.

When a markup language document is rendered to a display, certain text markers, indicia, or "tokens" in the ML document are identified, isolated, extracted, and replaced in the rendered product. Once isolated and extracted, a token is "resolved" by a token look-up method that references actual data in a database or local storage based on the token in the ML document. Resolution of a token allows an unchanging ML document to be rendered with particular instance information.

Information retrieved from a local data storage or information entered by a user may replace one or more tokens in a temporary copy of the persistent ML document located at the gaming machine 17 (i.e., "resolving the token"). In an embodiment, however, the ML document is not modified. The ML document may be stored in non-volatile storage, for example. Information in a local or remote data storage may be dynamically altered by other processes running on SCI 101 or other system component. For example, player identification information, player name, and player points may be stored in the local data storage.

Alternatively, default token values may be provided in the ML document. Additionally, a plurality of token values may be located in the ML document and selected by the user or ML viewer.

For example, an ML document includes a player name token indicating the name of the current player. The ML viewer accesses a local data storage via SCI 101 and determines that the current player is "John Doe." The ML document also includes a point token indicating a number of points for the current player. The ML viewer accesses the local data storage and retrieves the point total for the player (e.g., "John Doe has 1234 points."). Viewer displays a page including the ML document with appropriate tokens completed with values from data storage.

Thus, an ML document is a text document including markers for specifying portions of text that have different meanings for different consumers or different situations. The extensible nature of a markup language allows one user to add markers that are ignored by another consumer. Text contained within markers specify the content of the gaming machine's display. Different text and/or graphics may be configured and displayed for different consumers. Screen elements may be structured based on information denoted within certain markers.

Dynamic token resolution provides improved flexibility in gaming system display and operation. Local look-up of ML file and token information increases speed, as well as reliability. A local data store at a gaming machine or interface may function in conjunction with a server or external data storage to provide information redundancy. A gaming machine may operate on a local copy of an ML file that is periodically refreshed and/or synchronized with a remote copy. Rather than incurring a delay and relying on information transmitted from a server, local data storage in a gaming system provides more immediate access to data. A viewer process running on a gaming machine may reference local storage rather than continually reaching outside the machine for data from an external system. A ML file may be resolved with local information rather than rebuilding the file for display each time at an external server. Local storage may be persistent or volatile (e.g., holds a temporary copy of an ML file and/or token data and reloads in the event of a loss of power). One or more ML files may reside in local storage, and the viewer may switch among the stored documents. Additionally, maintaining communications inside the gaming system improves system security and data integration.

A ML file with tokens may be used to customize a gaming display to variety of options (e.g., user, game, etc.). The gaming industry is a highly regulated environment, and regulators often do not allow third party developers to modify data unless the third party is properly licensed. Often, companies may not obtain a license. Markup language allows a third party to separate data on a page from an application. Thus, data may remain untouched and used in a modifiable display. A static ML file with "blanks", such as tokens or other indicia, may receive gaming regulatory approval because the core document remains unchanged despite token resolution. A display may be completely customized without re-submitting the ML file to regulators for re-approval because the underlying data has not changed. Thus, a player may perceive a change in game on a gaming machine due to a change in token resolution while the underlying ML code remains the same. Additionally, a language being displayed may be customized to a particular player through appropriate token resolution.

Extensible Markup Language Files

In an embodiment, a markup language is a language that may be extensible (e.g., HTML, XML, XSLT, ASP, etc.). Modules may be delineated using a markup language, and existing modules may be modified. Modules may be placed around other modules or in other relationships with respect to other modules. Thus, a hierarchical structure may be constructing using a markup language.

Resource Interchange File Format (RIFF) files, such as Tagged Image File Format (TIFF), Audio Image File Format (AIFF), Motion Picture Experts Group (MPEG), Windows Audio Volume (WAV), Audio Video Interleaved (AVI), Musical Instrument Digital Interface (MIDI), or other file, are binary markup language files. Elements in an exemplary binary ML file includes a tag field indicating what the data is, a length field indicating how long the data is, and a data field including data. Binary ML files may also include pointers before the data field instructing a processing program to go to a certain location for the data. Additional tag(s), length(s), and data may be nested within a data field.

While the tag and length fields are binary, the data field may or may not be binary. Thus, text-based and/or binary data may be inserted in a binary ML file. Tokens may be inserted in the data, and may be resolved from the data field. Information may be added to music (e.g., WAV, MPEG, etc.), movies (e.g., MPEG, QuickTime, etc.), and/or images (e.g., TIFF, etc.). For example, text streams, buttons, position information, identification information, etc., may all be encoded in a binary ML file. A ML viewer reads the inserted information, but an audio/video system simply skips over the unknown data. Such insertion and access allows newer systems to take advantage of additional features and data, while older systems simply ignore the extra content. Thus, a flexible, adaptive, and backwards-compatible system is provided.

External Control of ML Processing

In addition, the markup language viewer may be externally influenced for navigation, refreshing and linking purposes in a gaming or ancillary gaming application. By using communications, such as inter-process, intra-process, inter-device, flags, semaphores, and/or other indicators, a ML viewer may be influenced to navigate to a location within the current ML document or to any of a number of other ML documents. Messages to the ML viewer originate from one or more external management processes, program inputs and/or user inputs.

In an embodiment, an external process, such as a hosting process, being aware of many conditions within a device, influences the displaying of the contents of a markup language document. An external process may transmit commands or other control information to SCI 101 to affect operation of the ML viewer. The ML viewer may navigate to and display the ML document immediately regardless of current or prior activity. A ML document viewer may perform a look-up process to resolve a destination "screen code" to a literal ML document file name. In another embodiment, a control program may send a message instructing a viewer, browser, or other program to access a certain web page.

The control program may react under particular conditions, such as a jackpot, a tilt, or other event at a gaming machine or other location. The control program may also react to a stimulus, such as insertion of a player or employee card, at a gaming system to generate a command for the viewer to execute a certain action or series of actions immediate. For example, if a player card is inserted, an external server loads player and/or tracking data and transmits an ML file to the viewer for immediate execution. The viewer receives the information from the external server, retrieves the ML file from storage, and processes the ML file.

In an embodiment, an initial ML document may be loaded at a gaming system. The initial document includes directions regarding where to advance next to display new pages on a display (e.g., FIG. 5). Process flow may proceed as dictated by the initial ML document or program sequence until an external process intervenes. An asynchronous interrupt by an external process redirects gaming system operation.

In another embodiment, a "hot spot" button or other indicator may be added to a gaming system display. Selecting the button triggers certain special functions. The button or indicator may be visible or may be hidden (for example, an Aristocrat logo may be a hot spot button).

Additionally, as shown in FIG. 5, an ML file may associate identification (ID) numbers with items for display. When an item is selected by a user (e.g., using a touch screen, keyboard, or mousing device), the ID number is relayed by a viewer program to a control program. The control program returns an ML file to the viewer program or transmits an instruction to access a certain ML file. The instruction may also be present in the current ML file. For example, FIG. 5 shows that form a form ID of 1, the next form link is 3. Pin numbers or other information typed at a touch pad, for example, may be verified through an association of display items with ID numbers.

In addition, a markup language viewer may be used for reporting interactivity to applications or processes external to the ML viewer in a gaming or ancillary gaming application. Through the use of inter-process communications, a markup language viewer reports activity to one or more external processes. Typically, activity consists of any clicks, touches, or page changes. An external hosting process may use activity information to alter its behavior. Attributes in a markup language document provide codes which may be sent to one or more external or hosting processes when user activity at the viewer activates associated visual elements.

Thus, certain embodiments provide a communications interface for a gaming machine with easier and less expensive wiring configurations along with a faster network response. Certain embodiments also allow wireless communication. Certain embodiments provide local storage capability for video clips, graphics and additional program functionality, resulting in faster display times and improved system response. Certain embodiments provide capture of real-time video for security verification, monitoring, and player communications. Use of standardized components decreases system cost and development time and reduces system installation and maintenance complexity. Certain embodiments may also provide specialized printers and additional reporting options for output of player and game information. Improved interfaces allow for easier and more rapid addition of new features through additional input solutions and peripheral devices.

Certain embodiments provide additional menu options resulting in more helpful player menus as well as less in-house personnel training for gaming machine configuration. Players may be provided with more game play and configuration options and changing options, depending on game, location, and other parameters. Security features may also be accessed by operators, depending upon permissions. Improved graphics and animation provide increased playability, entertainment, and marketing options for a gaming machine.

Certain embodiments provide a multimedia, integrated, smart gaming system. Information such as game data, player data, player tracking, slot accounting, and/or radio frequency identification (RFID) data, may be routed through an SCI for transmission between a gaming system and a server or other system. An SCI may be used to initiate communication with an external server and/or other gaming system. An SCI may allow additional information and/or services to be made available to a player or other user at a gaming system.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A communication interface for a first gaming system having a main display and a main processor that is arranged to use the main display to visually depict a game of chance to a player, said communication interface comprising:
   a secondary display that is separate from said main display;
   at least one data port configured to facilitate communication within said first gaming system, to bypass polling to directly communicate data between said first gaming system and at least one of a server, a database, and a second gaming system external to said first gaming system, to bypass polling to directly transmit data from said first gaming system to at least one of the server, the database, and the second gaming system, and to receive data from at least one of the server, the database, and the second gaming system for use at said first gaming system; and
   a secondary processor that is separate from said main processor, the secondary processor being configured to process said data communicated at said first gaming system for at least one of communication and execution by said first gaming system, the secondary processor being further configured to selectively choose between the main display and the secondary display to deliver video content to the player, wherein the video content is at least partially based on said data communicated at said first gaming system, and wherein the video content is unrelated to games provided on said gaming system.

2. The communication interface of claim 1, wherein said secondary processor initiates communication with an external server.

3. The communication interface of claim 1, wherein said secondary processor allows an application to be downloaded from a web server.

4. The communication interface of claim 1, wherein said secondary processor provides a secondary game at said first gaming system.

5. The communication interface of claim 1, wherein said secondary processor facilitates at least one of purchase and confirmation of at least one of items and services at said first gaming system.

6. The communication interface of claim 1, wherein said at least one data port routes at least one of game data, player data, player tracking information, slot accounting information, and radio frequency identification information.

7. The communication interface of claim 1, further comprising an audio system providing at least one of audio output and audio input.

8. The communication interface of claim 7, wherein said audio system facilitates voice over internet protocol communication.

9. The communication interface of claim 1, further comprising a printer for printing information from at least one of said first gaming system and said server.

10. A gaming network, said network comprising:
    a gaming system that includes a main display and a main processor that is arranged to use the main display to visually depict a game of chance to a player, the gaming system also including a communication interface that includes a secondary display that is separate to said main display; and
    a server providing at least one of an application, a service, and a status to said gaming system, wherein said communication interface initiates communication with said server to at least one of transmit and receive information, wherein said communication interface allows said gaming system to bypass being polled by said server to directly communicate with said server, wherein said communication interface transmits data from said gaming system to said server and receives data from said server for use at said gaming system, wherein said communication interface being further configured to selectively choose between the main display and the secondary display to deliver video content to the player, wherein the video content is at least partially based on said data communicated at said gaming system, and wherein the video content is unrelated to games provided on said gaming system.

11. The network of claim 10, wherein said communication interface allows games to be downloaded to said gaming system.

12. The network of claim 10, wherein said communication interface facilitates voice over internet protocol communication.

13. The network of claim 10, wherein said communication interface provides a secondary game at said gaming system.

14. The network of claim 10, wherein said communication interface allows access to the Internet.

15. The network of claim 10, wherein said communication interface facilitates at least one of purchase and confirmation of at least one of items and services at said gaming system.

16. The network of claim 10, wherein said communication interface translates information to an appropriate protocol for said gaming system.

17. The network of claim 10, further comprising a plurality of gaming systems, wherein each gaming system includes a communication interface.

18. The network of claim 17, wherein a communication from said server is relayed among said plurality of gaming systems using said communication interfaces.

19. The network of claim 17, wherein said plurality of gaming systems store redundant information, said redundant information retrievable via said communication interfaces.

20. A method for communication with a gaming system that includes a main display and a main processor that is arranged to use the main display to visually depict a game of chance to a player, said method comprising:

processing data with a secure communication interface for an application for execution by said gaming system, wherein the secure communication interface is housed in said gaming system and comprises a secondary display that is separate to the main display;

executing the application at said gaming system at least partially based on data of said secure communication interface;

using said secure communication interface to push data from said gaming system to said external system rather than waiting to be polled externally from the gaming system for data; and using said secure communication interface to selectively choose between the main display and the secondary display to deliver video content to the player, wherein the video content is at least partially based on said data of said secure communication interface, and wherein the video content is unrelated to games provided on said gaming system.

21. The method of claim 20, wherein said executing further comprises at least one of downloading an application from said external system, communicating said data to said external system, receiving said data from said external system, outputting said data at said gaming system, and tracking a user at said gaming system.

22. The method of claim 20, further comprising transmitting data from the gaming system to said external system in response to being polled externally from the gaming system for data.

* * * * *